Patented Feb. 4, 1936

2,029,592

UNITED STATES PATENT OFFICE 2,029,592

MANUFACTURE OF YEAST

Alfred Schultz, New York, N. Y., assignor to Standard Brands Incorporated, New York, N. Y., a corporation of Delaware No Drawing. Application December 29, 1931, Serial No. 583,711

7 Claims. (Cl. 195—20)

This invention relates to processes of manufacturing bakers' yeast which may be distributed in either compressed or dried form, and has as a general object the provision of a process which may be carried out in a simple, efficient and economical manner to the production of high yields of yeast of improved quality.

A further object of the invention is to provide a process of manufacturing bakers' yeast of good color and baking quality and of improved keeping quality.

A more particular object of the invention is to provide a process of manufacturing bakers' yeast of high yields and of good color and baking quality, and having improved quality so as to give a longer period in which the yeast may be distributed after manufacture than is possible by yeast made by heretofore known processes.

Other objects of the invention will in part be obvious and will in part appear hereinafter.

The invention accordingly comprises the several steps and the relation of one or more of such steps with respect to each of the others, which are exemplified in the following detailed disclosure, and the scope of the application of which will be indicated in the claims.

The present process is particularly applicable to the manufacture of bakers' yeast with aeration by heretofore known methods in which a portion of the yeast nutrients is initially placed in the fermenter and stocked with yeast and the remainder of the nutrients are added either fractionally or slowly and substantially continuously in accordance with the growth requirements of the yeast, although good results can also be obtained in the straight set type of fermentation.

Principal features of the invention are the use of stock yeast of the high protein type (that is, a yeast having a protein content of over 50% on a dry basis when grown under usual operating conditions), and so limiting the phosphorus nutriment supplied to the yeast during the propagating period as to give a final product having less than 50% protein content on a dry basis without decreasing its baking quality and while increasing its keeping quality.

Heretofore, in the use of such high protein stock yeast, attempts have been made to control the protein in the final yeast product so that it will be below 50%, by limiting the assimilable nitrogen supply, with the result that a marked decrease in yield was obtained and there was a tendency toward the production of yeast poorer in quality, both as regards color, baking strength and keeping quality.

My invention is particularly useful in connection with processes in which a suitable source of sugar material may be used, as, for example, molasses, and in which the nitrogen nutriment is supplied in the form of ammonium salts but, as above indicated, is not limited to a process in which the addition is continuous. However, the following example will illustrate the manner in which the invention may be applied commercially:

In using molasses as a source of sugar material, the phosphorus nutriment supplied to the yeast is held between 1.25% and 2%, based on the weight of the molasses, and preferably about 1.6% is used, the percentage in both cases being expressed as ammonium phosphate ($NH_4H_2PO_4$). A portion of this phosphorus nutriment, either in the form of ammonium phosphate or phosphoric acid, may be added to the molasses, which is preferably diluted, for example, to about 40° Bg., whereupon the mixture is heated to about 95° C. and filtered. Thereupon a portion of the treated molasses is placed in the fermenter and about 20% or more (based on the total molasses) of high protein type stock yeast, together with some ammonium salts, such as ammonium sulphate are added, and aeration is commenced. Propagation is then continued for a period of about eight hours, during which time the remainder of the molasses is added in accordance with the growth requirements of the yeast, and if all of the phosphorus nutriment has not been added to the molasses in the beginning, it should be added during the first few hours in the fermenter. The amount of ammonium nitrogen (expressed as ammonium sulphate), which is desirable in such a process, need not exceed about 8% based on the molasses, and this also should be added during the earlier stages of the propagating period. After all of the additions have been completed, the aeration is continued for about one hour to finish off the yeast, whereupon it is separated and pressed in the usual manner.

By the use of such process, net yields of around 100% of compressed yeast (26% solids) based on the molasses may be obtained, having a protein content of less than 50% (e. g. about 47%) and having extremely good color and baking quality and a keeping quality which exceeds that of yeast made by heretofore known processes.

It will thus be seen that by means of the present invention, a convenient, efficient and economical process of manufacturing bakers' yeast in high yield and of improved color, baking and keeping qualities is provided, and since certain changes in carrying out the above process, and certain modifications in the composition which embody the invention may be made without departing from its scope, it is intended that all matter contained in the above description shall be interpreted as illustrative and not in a limiting sense.

It is also to be understood that the following claims are intended to cover all of the generic and specific features of the invention herein described. Particularly it is to be understood that in said claims, ingredients or compounds recited in the singular are intended to include compatible mixtures of such ingredients wherever the sense permits.

Having described my invention, what I claim as new and desire to secure by Letters Patent is:

1. An aeration process for manufacturing bakers' yeast of high yield and improved quality, which comprises preparing a nutrient solution containing yeast assimilable sugar, nitrogen and phosphorus materials, adding to such nutrient solution a high protein type of stock yeast having a protein content of over 50% on a dry basis, propagating the yeast in said solution with aeration, and limiting the amount of phosphorus nutriment to between 1.25 and 2% expressed as mono-ammonium phosphate and based on the sugar material calculated as molasses so as to produce a yeast product having a protein content of less than 50% on a dry basis.

2. A process as claimed in claim 1, in which molasses is used as a principal source of sugar material, and the phosphorus nutriment is limited to between 1.25% and 2% expressed as mono-ammonium phosphate and based on the sugar material calculated as molasses.

3. An aeration process of manufacturing bakers' yeast of high yield and improved quality, which comprises preparing a nutrient solution containing yeast assimilable sugar, nitrogen and phosphorus materials, adding to said nutrient solution a high protein type of stock yeast having a protein content of over 50% on a dry basis, propagating the yeast in said solution with aeration and limiting the amount of phosphorus nutriment so as to produce a yeast product having a protein content of less than 50% on a dry basis, in which molasses is used as a principal source of sugar material, and the phosphorus nutriment is limited to between 1.25% and 2% expressed as mono-ammonium phosphate and based on the sugar material calculated as molasses, and in which a principal portion of nitrogen nutriment is supplied in the form of ammonium nitrogen and in an amount of 8% or less expressed as ammonium sulphate and based on the sugar material calculated as molasses.

4. A process of manufacturing bakers' yeast of high yield and improved quality, which comprises adding to a dilute nutrient solution containing yeast assimilable sugar, nitrogen and phosphorus materials a high protein type stock yeast having a protein content of over 50% on a dry basis, propagating the yeast in said solution with aeration and thereafter adding yeast nutrients in accordance with the growth requirements of the yeast, while limiting the phosphorus nutriment to between 1.25% and 2% expressed as mono-ammonium phosphate and based on the sugar material calculated as molasses to produce a yeast product having a protein content of less than 50% on a dry basis.

5. A process of manufacturing bakers' yeast of high yield and improved quality, which comprises adding to a dilute nutrient solution containing yeast assimilable sugar, nitrogen and phosphorus materials a high protein type stock yeast having a protein content of over 50% on a dry basis, propagating the yeast in said solution with aeration and thereafter adding yeast nutrients in accordance with the growth requirements of the yeast, including an amount of inorganic nitrogen nutriment of 8% or less expressed as ammonium sulphate based on the sugar material calculated as molasses and limiting the phosphorus nutriment to between 1.25% and 2% expressed as mono-ammonium phosphate and based on the sugar material calculated as molasses to produce a yeast product having a protein content of less than 50% on a dry basis.

6. A process of manufacturing bakers' yeast of high yield and improved quality, which comprises preparing a solution containing yeast assimilable sugar, nitrogen and phosphorus nutrients and having molasses as a principal source of sugar material, diluting a portion thereof, adding to said diluted portion a high protein type stock yeast having a protein content of over 50% on a dry basis, propagating the yeast in said solution with aeration, and thereafter adding the remainder of the prepared nutrient solution in accordance with the growth requirements of the yeast, while limiting the phosphorus nutriment to between 1.25% and 2% expressed as mono-ammonium phosphate and based on the sugar material calculated as molasses to produce a yeast product having a protein content of less than 50% on a dry basis.

7. A process of manufacturing bakers' yeast of high yield and improved quality, which comprises preparing a solution containing yeast assimilable sugar, nitrogen and phosphorus nutrients and having molasses as a principal source of sugar material, diluting a portion thereof, adding to said diluted portion a high protein type stock yeast having a protein content of over 50% on a dry basis, propagating the yeast in said solution with aeration, and thereafter adding the remainder of the prepared nutrient solution in accordance with the growth requirements of the yeast, including an amount of inorganic nitrogen nutriment of 8% or less expressed as ammonium sulphate based on the sugar material calculated as molasses, and limiting the phosphorus nutriment to between 1.25% and 2% expressed as mono-ammonium phosphate and based on the sugar material calculated as molasses to produce a yeast product having a protein content of less than 50% on a dry basis.

ALFRED SCHULTZ.